US008582669B2

(12) United States Patent
Chen, Jr.

(10) Patent No.: US 8,582,669 B2
(45) Date of Patent: Nov. 12, 2013

(54) NOISE REDUCTION CIRCUIT IN A DIGITAL ISOLATOR SYSTEM

(75) Inventor: Baoxing Chen, Jr., Westford, MA (US)

(73) Assignee: Analog Devices, Inc., Norwood, MA (US)

( * ) Notice: Subject to any disclaimer, the term of this patent is extended or adjusted under 35 U.S.C. 154(b) by 1127 days.

(21) Appl. No.: 12/540,000

(22) Filed: Aug. 12, 2009

(65) Prior Publication Data

US 2010/0111218 A1  May 6, 2010

Related U.S. Application Data

(60) Provisional application No. 61/109,747, filed on Oct. 30, 2008.

(51) Int. Cl.
*H04B 3/00* (2006.01)
*H04L 25/00* (2006.01)

(52) U.S. Cl.
USPC ............................ 375/258; 375/222; 375/257

(58) Field of Classification Search
USPC ........................................................ 375/258
See application file for complete search history.

(56) References Cited

U.S. PATENT DOCUMENTS

| 4,024,452 | A | 5/1977 | Seidel |
| 4,785,345 | A | 11/1988 | Rawls et al. |
| 5,469,098 | A | 11/1995 | Johnson, Jr. |
| 5,650,357 | A | 7/1997 | Dobkin et al. |
| 5,701,037 | A | 12/1997 | Weber et al. |
| 5,781,077 | A | 7/1998 | Leitch et al. |
| 2009/0168462 | A1* | 7/2009 | Schopfer et al. ........... 363/21.01 |
| 2010/0193907 | A1* | 8/2010 | Crawley et al. ................ 257/532 |

FOREIGN PATENT DOCUMENTS

WO    WO 99/21332    4/1999

OTHER PUBLICATIONS

G. Knoedl, Jr., et al., "A Monolithic Signal Isolator", IEEE, 1989, pp. 165-170.

* cited by examiner

*Primary Examiner* — Erin File
(74) *Attorney, Agent, or Firm* — Kenyon & Kenyon, LLP

(57) ABSTRACT

The invention is directed to a digital isolation system including an isolation barrier, a transmitter circuit receiving an input signal and transmitting a positive pulse upon detecting a first type of edge in the input signal and transmitting a negative pulse upon receipt of a second type of edge in the input signal and a receiver circuit receiving the transmitted signals, removing noise in the received signal and reconstructing the input signal using a differential comparator.

16 Claims, 5 Drawing Sheets

NOISE REDUCTION CIRCUIT IN A DIGITAL ISOLATOR SYSTEM

CROSS-REFERENCE TO RELATED APPLICATIONS

This application claims priority under 35 U.S.C. §119 to U.S. Provisional Patent Application No. 61/109,747, filed on Oct. 30, 2008, and entitled "Differential Coupler," which is herein incorporated by reference in its entirety.

BACKGROUND

In a variety of environments, signals must be transmitted between diverse sources and circuitry, while maintaining electrical (i.e., galvanic) isolation between the sources and the circuitry. A signal isolator is a device or circuit for transmitting logic signals across an isolation barrier. A signal isolator may use optical or magnetic isolation to transmit an input signal from one side of the isolation barrier to the other. Each side of the isolation barrier may operate at different voltages, have a different supply voltages and have separate, isolated grounds. Micro-transformers have been used as signal isolators in combination with either signal level detectors or edge detectors sending multiple pulses across the transformer upon receiving a positive input signal and a single pulse upon receipt of a negative input signal.

FIG. 1 illustrates a single-bit signal isolator manufactured by Analog Devices, Incorporated. The isolator includes edge detection circuits 101 and 103 for detecting rising and falling edges in the input signal. Edge detection circuit 101 outputs two pulses when a rising edge is detected and edge detection circuit 103 outputs a single pulse when a falling edge is detected. The output of the edge detection circuits 101 and 103 is input into an OR gate 104. The combined signals are then transferred across a micro-transformer 105. A receiver 106 then reconstructs the input signal by determining if the received signal has two pulses or one pulse.

The signals transferred across the isolation barrier typically have to be of a sufficient voltage to overcome noise in the system due to transient signals. The isolators are used in many noisy industry environments and there could be high common mode transients between the two grounds to be isolated. For a single high end receiver, the noise generated at the receiver by the common mode transients should be smaller than the receiver threshold and the signal generated by the transformer driver should be large enough to be reliably detected in the presence of noise.

FIG. 2 illustrates the a signal transmitted across an isolation barrier using micro-transformers and using the signal level detector technique which transmits a positive pulse upon detection of a rising edge and transmits a negative pulse upon detection of a falling edge in the input signal. As seen in FIG. 2, when the primary coil of the micro-transformer receives a positive pulse the secondary coil receives a positive pulse, however, there is a negative tail at the end of the received pulse. Likewise, when the primary coil receives a negative pulse the secondary coil receives a negative pulse, however, there is a positive tail at the end of the received pulse. The tail end of the pulses received on the secondary coil are caused by a buildup of current in the primary coil through its large serial resistance.

Because of the noise inherent in the digital isolator system, the transmitters must transmit signals using a large enough voltage to be detected over the noise. Accordingly, there is a need for a isolation system which reduces the amount of noise in the digital isolator system.

DETAILED DESCRIPTION

Figure 1:
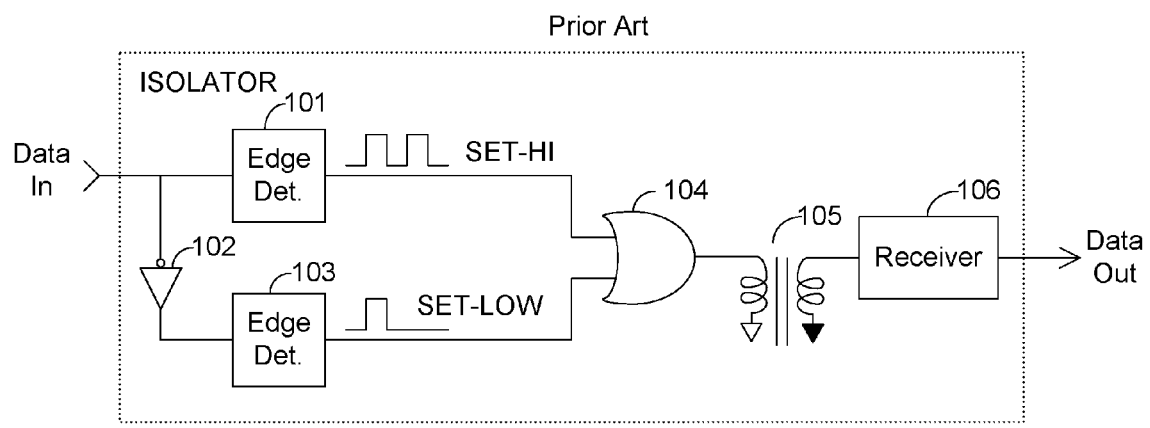
FIG. 1 illustrates a conventional isolator system.
Figure 2:
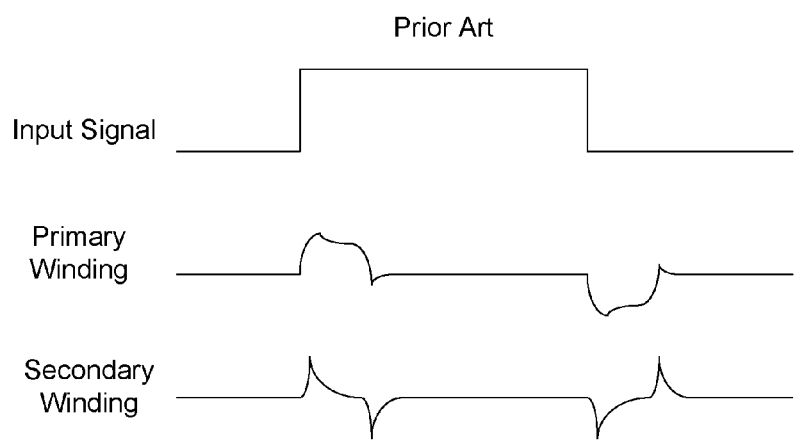
FIG. 2 illustrates a signal transmitted across the isolation barrier in the isolator system with micro-transformers.

A digital isolation system, in accordance with an embodiment of the present invention, may include an isolation barrier, a transmitter circuit receiving an input signal and transmitting a positive pulse upon detecting a first type of edge in the input signal and transmitting a negative pulse upon receipt of a second type of edge in the input signal, and a receiver circuit receiving the transmitted signals, removing transient noise in the received signal and reconstructing the input signal using a differential comparator. Because the described embodiment uses a differential comparator, transient signals should be common to both inputs and should be rejected by the differential comparator. In contrast, in a signal isolator which determines if a positive or negative edge exists in a received signal by determining how many pulses were received (i.e., how many pulses were received which exceeded a threshold voltage), transient signals can cause degradation of the received signal decreasing the accuracy of the reconstruction. Furthermore, with the rejection of common mode noises, the signals transmitted across the isolation barrier can be smaller, allowing for lower power dissipation. Furthermore, the claimed embodiment has a shorter propagation delay than the isolation system illustrated in FIG. 1 since the receiver circuit no longer needs to differentiate the leading edge or falling edge in the time domain.

Figure 3:
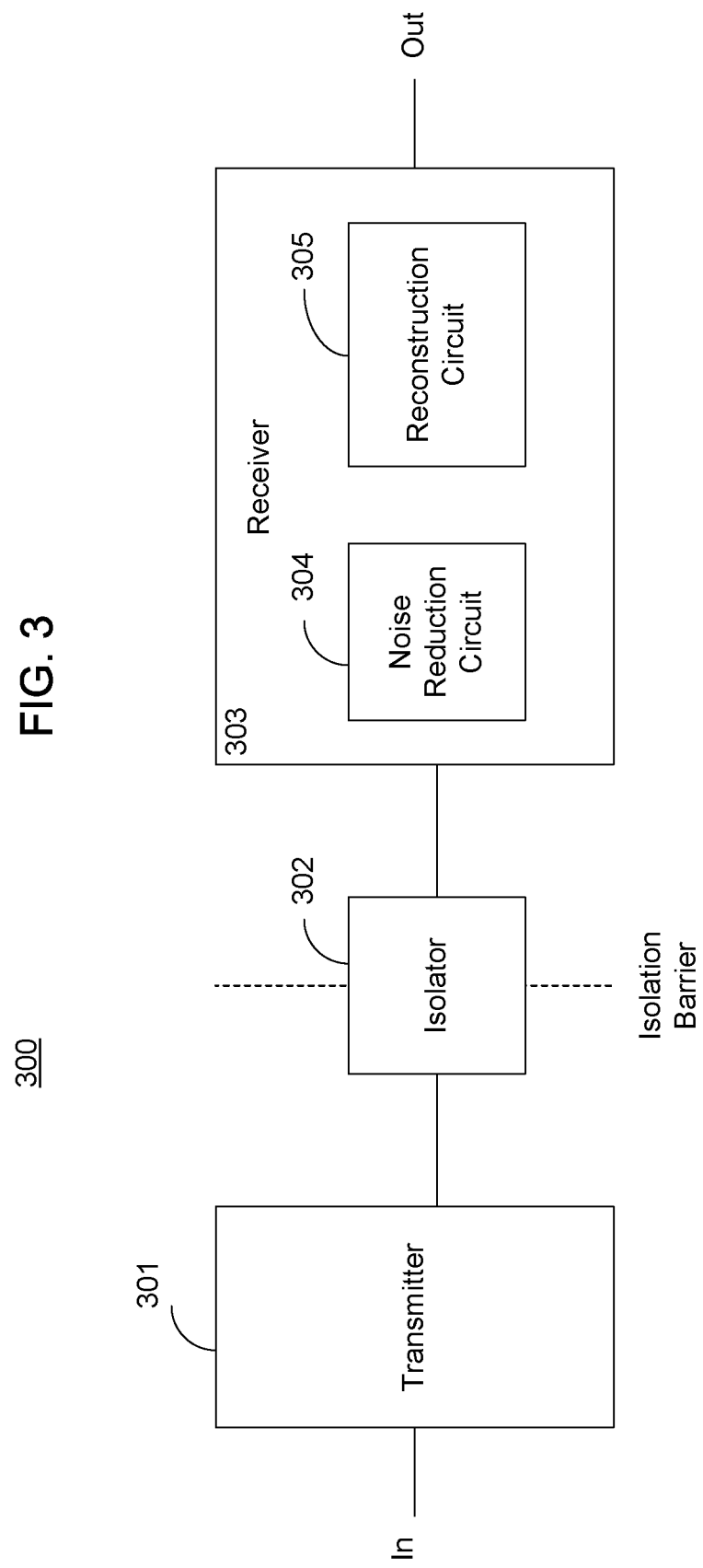
FIG. 3 illustrates an exemplary digital isolator according to one embodiment of the present invention.

An exemplary embodiment of the isolation system 300 in accordance with the present invention can be seen in FIG. 3. FIG. 3 illustrates a transmitter circuit 301 coupled to a receiver circuit 303 through an isolator 302. The isolator 302 bridges an isolation barrier that provides galvanic isolation between the transmitter circuit 301 and the receiver circuit 303. The transmitter circuit 301 receives an input signal and transmits signals to the isolator 302 corresponding to the input signal. The receiver circuit 303 includes a noise reduction circuit 304 removing a noise component in the received signal and further includes a reconstruction circuit 305 reconstructing the input signal from the received signal after the noise components have been removed.

The principles of the present invention may be applied to a variety of isolators including micro-transformers, optical isolators, magneto-resistive sensors, capacitive isolators and other types of coil- or transformer-based isolators. Micro-transformers, which are formed of flat, parallel conductive windings, provided on a semiconductor substrate may be advantageous due to speed, power, edge symmetry and cost considerations.

Figure 4:
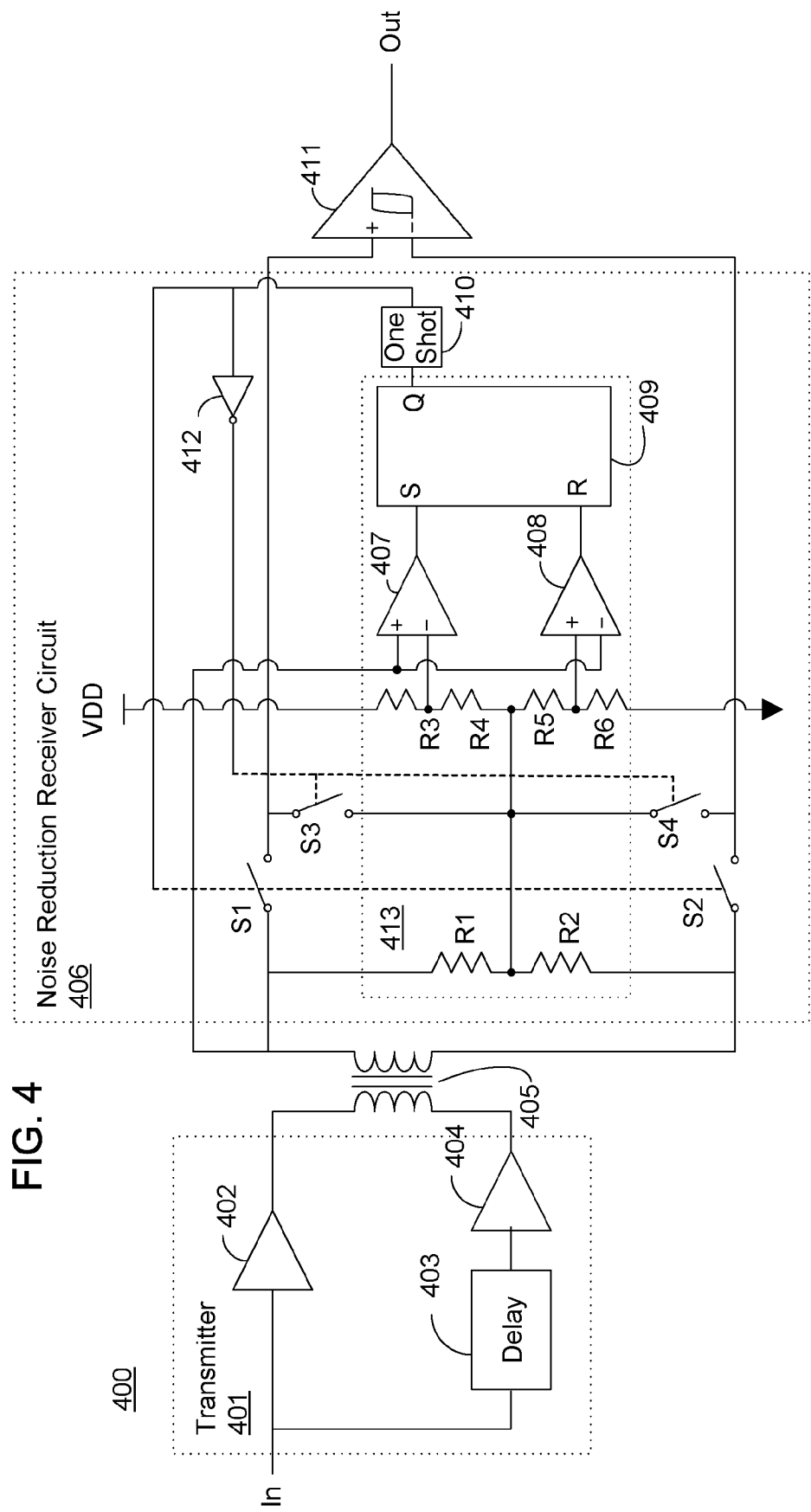
FIG. 4 illustrates yet another exemplary digital isolator according to one embodiment of the present invention.

FIG. 4 illustrates another exemplary embodiment of the isolation system 400 in accordance with the present invention. The isolation system may include a transmitter circuit 401 receiving an input signal IN. The transmitter circuit includes a first buffer 402, a delay circuit 403 and a second buffer 404. The input signal IN is connected to the first buffer 402 and the delay circuit 403. The output of the delay circuit 403 is connected to the input of buffer 404. The output of buffer 402 is connected to a first side of a primary coil of the micro-transformer 405. The output of buffer 404 is connected to a second side of the primary coil of the micro-transformer 405.

An exemplary noise reduction circuit 406 is illustrated in FIG. 4. The noise reduction circuit 406 may include a signal detecting circuit 413 including a first voltage divider, comprising resistors R1 in series with R2, which is connected in parallel with the secondary coil of transformer 405. The signal detecting circuit 413 may further include a second voltage divider comprising resistors R3 in series with resistor R4. Resistor R3 may be connected to a voltage source VDD. Resistor R4 may be connected to the input of a third voltage divider comprising resistors R5 and R6 connected in series. Resistor R6 may be further connected to ground. An output of the first voltage divider may be connected between the second and third voltage dividers.

The output of the second voltage divider may be connected to an input of comparator 407. Likewise, the output of the third voltage divider may be connected to an input of comparator 408. Comparators 407 and 408 each may have an input connected to a first side of the secondary coil of transformer 405. The output of comparator 407 may be connected to a set gate S of flip-flip 409. The output of comparator 408 may be connected to the reset gate R of flip-flop 409. Accordingly the voltage dividers, comparators 407 and 408 and flip-flop 409 detect when the secondary winding of micro-transformer 405 receives a signal. The output of flip-flop 409 is connected to a one shot circuit 410. Both differential comparators 407 and 408 may have built-in negative offsets such that their outputs are default low when their differential inputs are zero.

The output of the one shot circuit 410 is further connected to switches S1-S2 and switches S3-S4, after the output is inverted by inverter 412, to control when the switches open and close. When switches S1 and S2 are closed and switches S3 and S4 are open, the comparator 411 receives as input the voltage developed across micro-transformer 405. When switches S1 and S2 are open and switches S3 and S4 are closed the inputs to comparator 411 are shorted. Accordingly, the one shot circuit 410 and switches S1-S4 combine to cause the tail end of the received signals to be cut off at a predetermined time, based upon the signals being detected by the comparators 407 and 408.

The reconstruction circuit 305 of FIG. 3 may comprise the comparator 411 of FIG. 4. A first input of the comparator 411 may be connected to a first side of the secondary coil of transformer 405 through switch S1. A second side of the comparator 411 may be connected to a second side of the secondary coil of transformer 405 through switch S2.

Figure 5:
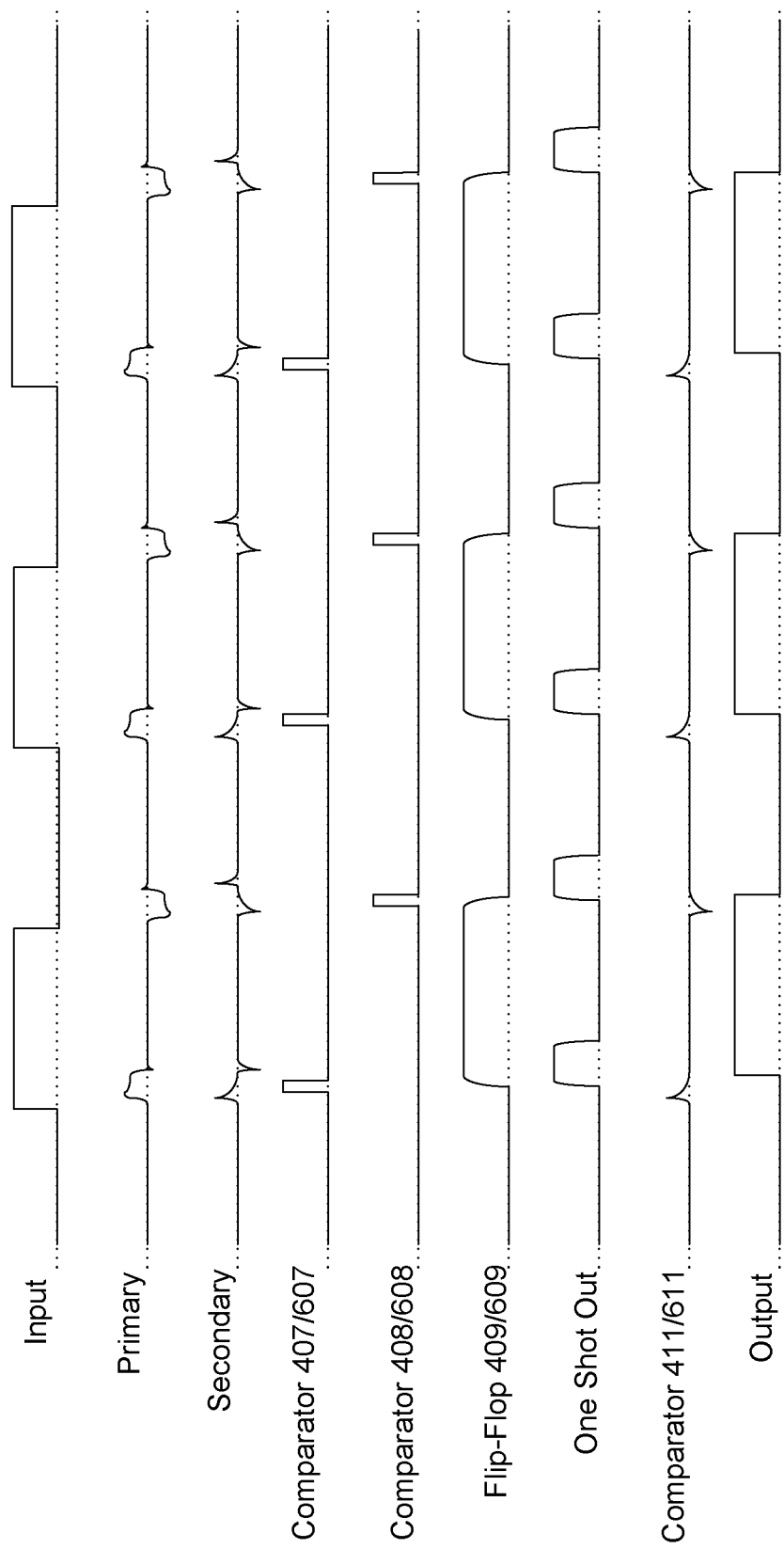
FIG. 5 illustrates the operation of the digital isolator illustrated in FIG. 4.

FIG. 5 illustrates exemplary waveforms that may be generated by the isolation system illustrated in FIG. 4. The input signal can be synchronous or asynchronous and is received at the terminal IN before being transmitted to the primary coil of the micro-transformer 405. The primary signal illustrates the input signal received by the primary winding of transformer 405 after passing through buffer 402, delay circuit 403 and buffer 404. The secondary signal illustrates the signal received by the secondary winding of micro-transformer 405. As seen in FIG. 5, when the primary coil receives a positive pulse the secondary coil receives a positive pulse, however, there is a negative tail at the end of the received pulse. Likewise, when the primary coil receives a negative pulse the secondary coil receives a negative pulse, however, there is a positive tail at the end of the received pulse. The tail end of the pulses received on the secondary coil are caused by a buildup of current in the primary coil through its large serial resistance. In order to use a simple differential comparator to accurately reconstruct the input signal, the tail ends of the signals received by the secondary coil are removed by the noise reduction circuit 406 to avoid an unintended triggering of the comparator 411.

The first comparator 407 receives then input from a first side of the secondary winding at a positive gate of the op amp and receives the output from the second voltage divider at the negative input. As seen in FIG. 5, when the secondary winding receives a positive pulse the voltage on the positive gate of the op amp exceeds the voltage of the second voltage divider causing the comparator 407 to issues a pulse. Similarly, since the secondary winding is connected to the negative gate of the comparator 408, when the secondary winding receives a negative pulse the output of the third voltage divider will be greater than the voltage on the secondary winding, thus causing comparator 408 to output a positive pulse as seen in FIG. 5.

When comparator 407 outputs the positive pulse, the output of the flip-flip will go high as seen in FIG. 5 since comparator 407 is connected to the set gate of flip flop 409. Conversely, when comparator 408 issues a positive pulse, the output of flip flop 409 will go low, since comparator 408 is connected to the reset gate of flip flop 409. Upon detecting a positive or negative edge in the output of the flip flop 409, the one shot circuit will issue a positive pulse for a predetermined length of time. A seen in FIG. 4, switches S1, S2, S3 and S4 are controlled by the output of the one shot circuit. As seen in FIG. 5, before the one shot circuit causes switches S1 and S2 to open and S3 and S4 to close, the signal received by the comparator 411 follows the signal received by the secondary windings of the micro-transformer 405. When the one shot circuit issues a positive pulse, switches S3 and S4 will close and switches S1 and S2 open, shorting the input to the master comparator 411 and thereby removing the tail ends of the signals received on the secondary windings of micro-transformer 405. By removing the tail ends of the signal, the overall amount of noise in the system is reduced.

As seen in FIG. 5, the input to the comparator 411 mirrors the secondary input but without the respective tails. Accordingly, a simple differential comparator can be used to reconstruct the input. The output of the comparator 411 will go high when the differential input is larger than a positive threshold and will stay high until the differential input is smaller than a negative threshold. Likewise, the output of the comparator would remain low until the differential input again becomes larger than the positive threshold.

Because the described embodiment uses a differential comparator, any transient signals in the system would be common to both inputs and would be rejected by the differential comparator. Also, with the rejection of common mode noises, the signals transmitted by the transmitter circuit can be smaller, allowing for lower power dissipation. Accordingly, the digital isolator system described in FIG. 4 will not only have improved noise immunity, but will also allow for higher performance with a lower cost. Furthermore, the digital isolator system described in FIG. 4 will have a shorter propagation delay as the receiver will no longer need to differentiate between a leading or falling edge in the time domain.

Figure 6:
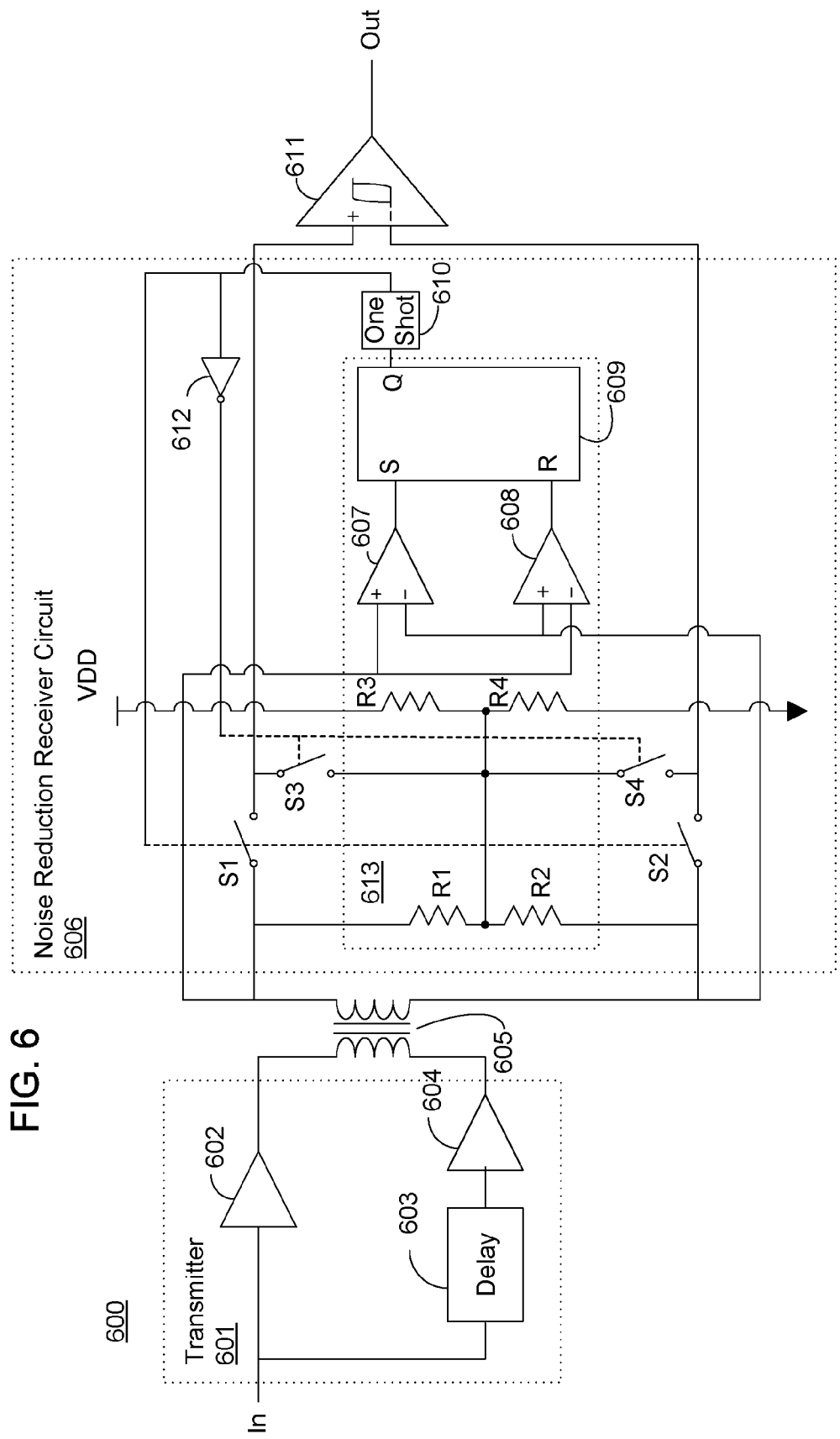
FIG. 6 illustrates yet another exemplary digital isolator according to one embodiment of the present invention.

FIG. 6 illustrates another exemplary embodiment of the isolation system 600 in accordance with the present invention. The isolation system may include a transmitter circuit 601 receiving an input signal IN. The transmitter circuit includes a first buffer 602, a delay circuit 603 and a second buffer 604. The input signal IN is connected to the first buffer 602 and the delay circuit 603. The output of the delay circuit 603 is connected to the input of buffer 604. The output of buffer 602 is connected to a first side of a primary coil of the micro-transformer 605. The output of buffer 604 is connected to a second side of the primary coil of the micro-transformer 605.

An exemplary noise reduction circuit 606 is illustrated in FIG. 6. The noise reduction circuit 606 may include a signal detecting circuit 613 including a first voltage divider, comprising resistors R1 in series with R2, which is connected in parallel with the secondary coil of transformer 605. The signal detecting circuit 613 may further include a second voltage divider comprising resistors R3 in series with resistor R4. Resistor R3 may be connected to a voltage source VDD. Resistor R4 may be connected ground. An output of the first voltage divider may be connected between resistors R3 and R4 of the second voltage divider.

Comparators 607 and 608 each may have a first input connected to a first side of the secondary coil of transformer 605 and a second input connected to a second side of the secondary coil of transformer 605. The output of comparator 607 may be connected to a set gate S of flip-flip 609. The output of comparator 608 may be connected to the reset gate R of flip-flop 609. Accordingly the comparators 607 and 608 and flip-flop 609 detect when the secondary winding of micro-transformer 605 receives a signal. The output of flip-flop 609 is connected to a one shot circuit 610. Both differential comparators 607 and 608 may have built-in negative offsets such that their outputs are default low when their differential inputs are zero.

The output of the one shot circuit 610 is further connected to switches S1-S2 and switches S3-S4, after the output is inverted by inverter 612, to control when the switches open and close. When switches S1 and S2 are closed and switches S3 and S4 are open, the comparator 611 receives as input the voltage developed across micro-transformer 605. When switches S1 and S2 are open and switches S3 and S4 are closed the inputs to comparator 611 are shorted. Accordingly, the one shot circuit 610 and switches S1-S4 combine to cause the tail end of the received signals to be cut off at a predetermined time, based upon the signals being detected by the comparators 607 and 608.

While the above described embodiments discuss using a signal level based isolation system, the noise reduction circuit could also be used in other isolation systems to improve noise immunity such as edge detection based isolation systems.

Several embodiments of the invention are specifically illustrated and/or described herein. However, it will be appreciated that modifications and variations of the invention are covered by the above teachings and within the purview of the appended claims without departing from the spirit and intended scope of the invention.

I claim:

1. An isolator system, comprising:
    an isolator to transmit signals across an isolation barrier,
    a receiver coupled to the isolator, comprising:
        a reconstruction circuit coupled to the isolator to generate a logic signal from pulses received by the reconstruction circuit from the isolator, and
        a noise reduction circuit coupled to the isolator and to the reconstruction circuit, the noise reduction circuit responsive to a first pulse received from the isolator to block the reconstruction circuit from receiving subsequent pulses from the isolator within a predetermined time after reception of the first pulse.

2. The isolation system according to claim 1, the receiver further comprising:
    a signal detector detecting the receipt of the first pulse from the isolator, wherein the noise reduction circuit is triggered by the signal detector.

3. The isolation system according to claim 1, wherein the noise reduction circuit removes noise in the received signal by shorting the inputs to a differential comparator.

4. The isolation system according to claim 1, wherein the noise reduction circuit removes a negative tail when the first pulse is a positive pulse and removes a positive tail when the first pulse is a negative pulse.

5. The isolation system according to claim 1, further comprising a transmitter circuit, receiving a signal input to the isolation system and transmitting a positive pulse across the isolation barrier in response to a positive edge in the signal input to the isolation system and transmitting a negative pulse across the isolation barrier in response to a negative edge in the signal input to the isolation system.

6. The isolation system according to claim 5, wherein the noise reduction circuit removes a negative tail a positive pulse is transmitted across the isolator and removes a positive tail when the a negative pulse is transmitted across the isolation barrier.

7. The isolation system according to claim 1, wherein the reconstruction circuit comprises a differential comparator reconstructing a signal input to the isolator system.

8. The isolation system according to claim 1, wherein a transmitter side of the isolator and a receiver side of the isolator are galvanically isolated.

9. The isolation system according to claim 1, wherein the isolator is a micro-transformer.

10. A method of removing noise in a digital isolation system, comprising:
    receiving a signal transmit across an isolator;
    blocking, responsive to a first pulse received from the isolator, a reconstruction circuit from receiving subsequent pulses from the isolator within a predetermined time after reception of the first pulse
    reconstructing, by the reconstruction circuit, a signal input to the digital isolation system based upon the received signal.

11. The method according to claim 10, wherein the blocking further comprises shorting the inputs to the reconstruction circuit upon detecting the first pulse received from the isolator.

12. The isolation system according to claim 10, the blocking further comprising removing a negative tail on positive pulse transmitted across the isolator and removing a positive tail on the a negative pulse transmitted across the isolator.

13. The method according to claim 10, wherein the reconstruction circuit comprises a differential comparator.

14. The method according to claim 10, wherein the digital isolation system is galvanically isolated.

15. The method according to claim 10, wherein the isolator is a micro-transformer.

16. The method according to claim 10, further comprising:
    transmitting, to the isolator, a positive pulse upon detecting a positive edge in a signal input to the digital isolation system; and
    transmitting to the isolator, a negative pulse upon detecting a negative edge in the signal input to the digital isolation system, wherein the blocking further comprises removing a negative tail on the received signal when the positive pulse transmitted across the isolator and removing a positive tail on the received signal when a negative pulse is transmitted across the isolator.

* * * * *

UNITED STATES PATENT AND TRADEMARK OFFICE
CERTIFICATE OF CORRECTION

| | | |
|---|---|---|
| PATENT NO. | : 8,582,669 B2 | Page 1 of 1 |
| APPLICATION NO. | : 12/540000 | |
| DATED | : November 12, 2013 | |
| INVENTOR(S) | : Baoxing Chen | |

It is certified that error appears in the above-identified patent and that said Letters Patent is hereby corrected as shown below:

In the Claims

Column 6, line 25, please change:

"tail a positive" to -- tail when the positive --;

Column 6, line 27, please change:

"when the a negative" to -- when the negative --;

Column 6, line 52, please change:

"tail on positive" to -- tail on a positive --;

Column 6, line 54, please change:

"tail on the a negative pulse" to -- tail on a negative pulse --.

Signed and Sealed this
Seventeenth Day of June, 2014

Michelle K. Lee
*Deputy Director of the United States Patent and Trademark Office*